US005617467A

United States Patent [19]
Bacher et al.

[11] Patent Number: 5,617,467
[45] Date of Patent: Apr. 1, 1997

[54] COMMUNICATION SYSTEM FOR CONNECTION TO A BASE STATION OF A MULTI-CELLULAR WIRELESS TELEPHONE SYSTEM

[75] Inventors: Thomas Bacher; Frank Heineck, both of Munich; Karl Klug, Miesbach, all of Germany

[73] Assignee: Siemens Aktiengesellschaft, Munich, Germany

[21] Appl. No.: 214,570

[22] Filed: Mar. 18, 1994

[30] Foreign Application Priority Data

Mar. 26, 1993 [DE] Germany .......................... 43 09 848.7

[51] Int. Cl.[6] .................................................. H04M 11/00
[52] U.S. Cl. .................................................. 379/58; 379/94
[58] Field of Search .................................. 379/58, 59, 63, 379/94, 93

[56] References Cited

U.S. PATENT DOCUMENTS

| | | | |
|---|---|---|---|
| 5,259,021 | 11/1993 | Antilla et al. | 379/58 |
| 5,274,694 | 12/1993 | Lechner et al. | 379/63 |
| 5,319,699 | 6/1994 | Kerihuel et al. | 379/58 |
| 5,321,737 | 6/1994 | Patsiokas | 379/58 |
| 5,363,429 | 11/1994 | Fujisawa | 379/58 |
| 5,454,026 | 9/1995 | Tanaka | 379/60 |

FOREIGN PATENT DOCUMENTS

| | | | |
|---|---|---|---|
| 0320891A2 | 6/1989 | European Pat. Off. | H04Q 11/04 |
| 0226610B1 | 3/1990 | European Pat. Off. | H04B 7/26 |
| 0479768A2 | 4/1992 | European Pat. Off. | H04J 3/12 |
| 0522774A2 | 1/1993 | European Pat. Off. | H04Q 7/04 |

OTHER PUBLICATIONS

Funkschau 21/1990, Mobile Kommunikation "Schnurlose Burosysteme fur die neunziger Jahre", by Von Geraldine Wilson, pp. 52–54.

Philips Telecommunication Review—vol. 49, No. 3, Sep. 1991, "Dect, A Universal Cordless Access System", by R. J. Mulder, pp. 68–73.
Funkschau Nov. 1991, Funktechnik, "Die Basisstation im GSM–Mobilfunknetz", Von Rudi Markschlager, pp.58–62.
Telecommunications, Apr. 1989, Geiger et al "Integrated Circuits For ISDN—Status and Future", pp. 190–195.
Electronic Engineering, Jun., 1990, No. 762, "Ericsson Use TDMA For Pre–Dect Telephone", pp. 58 and 59.
IEEE Global Telecommunications Conference & Exhibition, Dec. 1, 1988, Skaperda, "The ESWD Today, Plans For Tomorrow", pp. 1211–1220.

(List continued on next page.)

Primary Examiner—Edward L. Coles, Sr.
Assistant Examiner—Fan Lee
Attorney, Agent, or Firm—Hill, Steadman & Simpson

[57] ABSTRACT

A system is provided for connection of terminal equipment units of wireless telephone systems. A communication system is connected by trunk lines to a plurality of base stations. Each base station has a radio module for communicating with a plurality of terminal equipment units. The communication system has a plurality of base station line modules, with each base station line module having a switching unit for effecting a switching of the communication terminal equipment units wirelessly connected to the base station. Furthermore, in each base station line module, the switching unit is connected to a transmission unit which in turn connects to the trunk lines, said trunk lines connecting to the base stations. The transmission unit in each base station line module and its respective trunk lines communicate digitized voice and signalling information according to a burst-operation transmission method. For reducing the number of trunk lines, compression units (ADPCM) that compress or decompress the digitized voice signals are provided in the base station line modules of the communication system. To save expense, the switching unit in each base station line module, the radio module in each base station, and the transmission unit in each base station line module are provided as integrated circuits.

12 Claims, 2 Drawing Sheets

OTHER PUBLICATIONS

IEEE Communications Magazine, Jan., 1991, "A Business Cordless PABX Telephone System on 800 MHz Based on the Dect Technology", by Colin Buckingham et al, pp. 105–110.

Ericsson Review No. 8, 1987, "Ericsson Cellular Mobile Telephone Systems", by Goran Soderholm et al, pp. 42–49.

Ascom Technische Mitteilungen, Mar./Apr., 1991, "Die schnurlose Teilnehmervermittlungs–anlage CTS 800"—von der Idee zum Produkt., pp. 14–24.

COMMUNICATION SYSTEM FOR CONNECTION TO A BASE STATION OF A MULTI-CELLULAR WIRELESS TELEPHONE SYSTEM

BACKGROUND OF THE INVENTION

EP 0 226 610, incorporated herein, discloses that base systems of wireless telecommunication systems can be connected to a communication system, particularly a private branch exchange. The base system comprises a switching-oriented, and potentially a radio-oriented, part. The switching-oriented part is connected, first, to the communication system, and second to the radio-oriented parts via distributor devices. These radio-oriented parts are either integrated in the base system or form detached, i.e. spatially separate, radio stations. The base system is connected to the communication system via a plurality of connecting lines. A separate connection between the communication system and the wireless telephone system is thereby provided for each wireless communication terminal equipment—known as a cordless telephone in the technical field—connected to the base system, i.e. via a radio connection. Furthermore, the detached radio stations are brought to the base system via further connecting lines. This denotes a substantial circuit-oriented expense for different transmission methods and different transmission rates, and also means an added expense for additional connecting lines, associated with additional installation or connection expense—for example, plug and distributor devices.

SUMMARY OF THE INVENTION

It is an object of the invention to link wireless telephone systems to a communication system with the lowest possible expense.

According to the invention, a communication system is provided for connection of communication terminal equipment units of wireless telephone systems. A radio is provided for effecting wireless transmission to the communication terminal equipment units. Switching units are provided for switching of the communication terminal equipment units. Transmission units are connected to the switching units providing a burst-operation transmission method. The transmission units are respectively connected via trunk lines that transmit digitized voice and signalling information according to the burst-operation transmission method. One transmission channel is provided for each wirelessly connected communication terminal equipment unit.

A critical aspect of the communication system of the invention is that the switching unit required for the switching of the wirelessly connected communication terminal equipment or telephone terminal equipment is provided in the communication system, and the radio unit provided for the wireless communication of the voice and signalling information is realized in a base station. A transmission unit connected to the switching unit is provided in the communication system. The coupling of the communication system and of the base stations is achieved via the voice and signalling information with trunk lines that switch according to the burst operation transmission method, whereby one transmission channel is provided for every wirelessly connected communication terminal equipment. A critical advantage of this concept is that, first, the expense for the realization of the switching unit is reduced due to the integration of the switching-oriented part and the at least partial co-use of the existing unit for operation or administering the communication system thus achieved; and second, the expense for the linkage—particularly in view of switching technology, trunk lines and installation or plug units—is substantially reduced due to the direct, multi-channel connection of the base stations to subscriber lines of the communication system that are simple to realize in transmission-oriented terms.

The switching unit that effect the switching of the wirelessly connected communication terminal equipment and the transmission unit are especially advantageously realized in each base station line module of the communication system and are designed such that this base station line module is connectable to the existing subscriber line module interface. As a result of this measure, the integration of the switching unit into the communication system is achieved with the lowest possible expense, since the structural integration of a base station line module designed like other subscriber line modules—for example, for analog and digital subscribers—to an existing interface is possible without additional structural expense. The programs implemented in the communication system particularly the switching program and the program for administering the communication system—can continue to be employed with slight modifications. The switching unit in each base station line module is advantageously formed by a periphery controller. The periphery controller comprises an internal subscriber line module bus interface of the communication system at the communication system side that is PCM-oriented—for example, a PCM multiplex interface with 2 Mbit/s. The periphery controller is connected to the transmission unit via an ISDN-oriented system bus interface which, for example, comprises a plurality of message channels and one signalling channel. The coupling of the base stations to the transmission unit of each base station line module occurs via a transmission interface operating according to the burst-operation transmission method. This transmission interface represents an especially economically realizable interface for the connection of digital, ISDN-oriented communication terminal equipment to private branch exchanges. The ISDN-oriented transmission interface usually comprises two message channels, i.e. B-channels, and one signalling channel, i.e. D-channel.

The transmission unit is especially advantageously realized according to a communications switching unit proposed in German Patent Application P 41 41 493.4. As a result of this realization, an especially advantageous control of the signalling information communicated from the communication terminal equipment is effected, as a result whereof the realization expense for an interface unit is additionally reduced.

According to another advantageous development of the communication system of the invention, the base station line module is equipped with a compression unit that compresses or decompresses the digitized voice information. This is especially advantageously effected with a compression unit operating according to the delta modulation method. A compression unit is advantageously formed by four echo-compensating compression circuits that respectively compress or decompress the digitized voice signals for four bidirectional transmission channels. These compression circuits each respectively comprise a PCM-oriented bus interface having a transmission rate of 2048 Kbit/s that is connected to the bus interface of the switching unit. The compression or decompression and the echo compensation or echo suppression—particularly caused by the radio technology of the digitized voice signals—is preferably realized according to CCITT Recommendations G.726, G.721, G.723, incorporated herein. Four or eight voice channels can be transmitted via a trunk line between the communication system and the base stations due to the compression of the digitized voice information from, for example, a 64 to 32 or 16 Kbit/s transmission rate. Thus, the signalling information can continue to be transmitted in one channel on the basis of the handling proposed in German Patent Application P 41 41 493.4. As a result of these measures, the expense for the linkage of the base stations to the communication system is additionally substantially reduced, since both trunk lines, as well as circuit technology, are eliminated. Alternatively, the plurality of communication terminal equipment units cordlessly connected to the base stations can be substantially increased given the same trunk line expense.

A plurality of line termination units are provided in the base stations as transmission units, and each respectively operate according to the burst operation transmission method and comprise an ISDN-oriented, internal system interface. The ISDN-oriented interface thereof is respectively connected to a burst means editing the digitized voice signals burst-oriented for a radio transmission and the processor interface thereof is connected to a central controller. The burst module is connected to the central controller and to the radio transmission part. The line termination unit is thereby likewise realized by a communications switching unit proposed according to German Patent application P 41 41 493.4. As in the base station line module as well, an especially economical realization in view of program-oriented and circuit-oriented expense is achieved on the basis of this measure.

The burst controller and the radio transmission part are designed such that the burst-oriented, digitized voice and signalling information as well as the received radio signals or the radio signals to be broadcast are realized according to the DECT standard (Digital European Cordless Telecommunication) of the ETSI (European Telecommunications Standard Institute). The formation of burst-oriented, digitized voice signals and the allocation to transmission or reception channels as well as the formation of the transmission and reception radio signals is standardized in this DECT standard.

The communication system of the invention shall be set forth in greater detail below with reference to a block circuit diagram.

DESCRIPTION OF THE PREFERRED EMBODIMENTS

Figure 1:
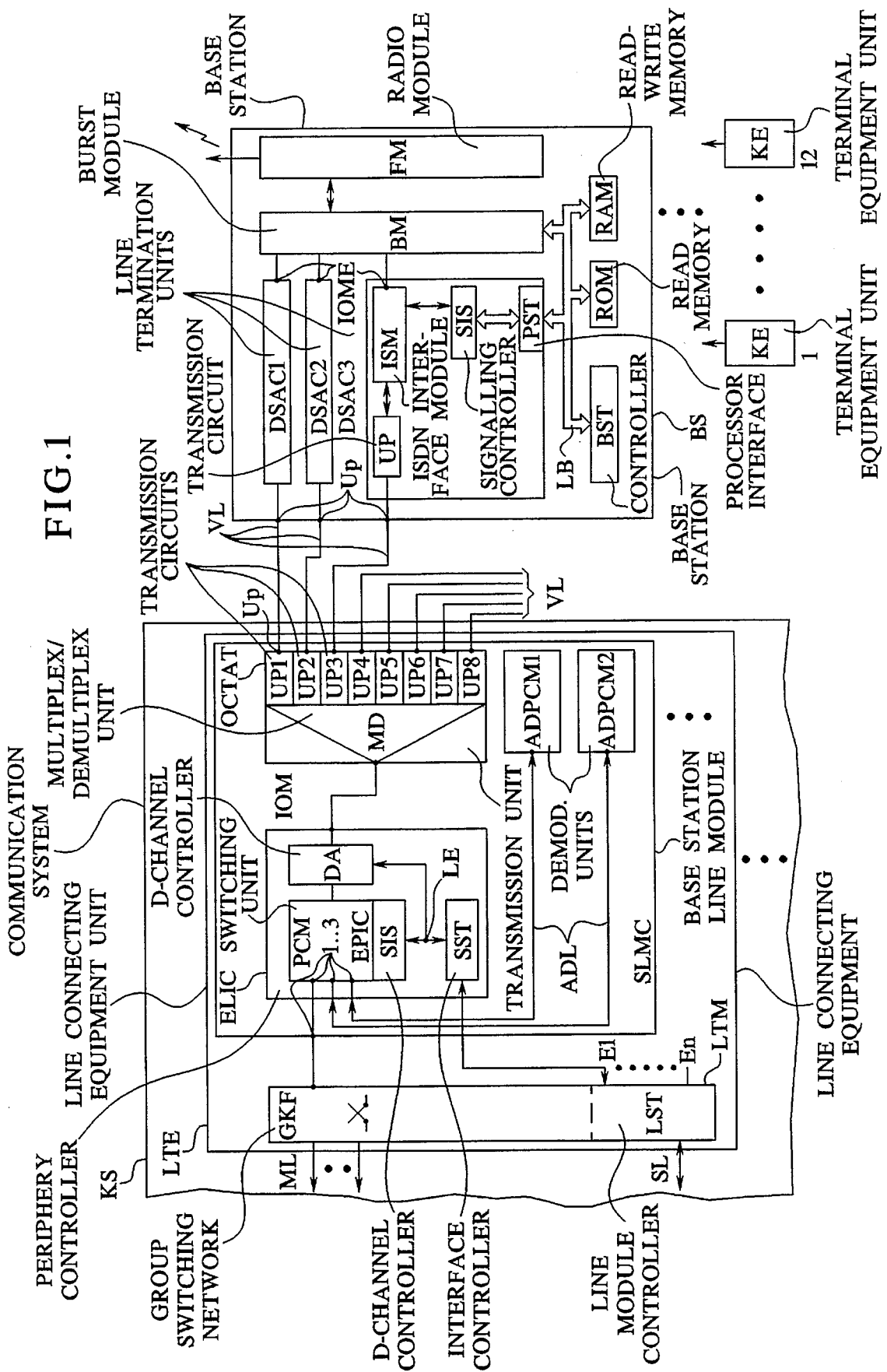
FIG. 1 is a block diagram of a communication system linked to a wireless telephone system in accordance with the invention.

The block circuit diagram of FIG. 1 shows a communication system KS to which a base station BS is connected via three of the eight illustrated trunk lines VL. The remaining five trunk lines VL are connected to further base stations BS that are not shown and are indicated by dots. The trunk lines VL are conducted in the communication system KS to a transmission unit OCTAT arranged in a base station line module SLMC. A transmission circuit UP1 . . . UP8 is provided in the transmission unit OCTAT for every incoming trunk line VL. A UP interface operating according to the burst-operation transmission method is respectively realized by these transmission circuits UP1 . . . UP8. The UP interface is provided for the connection of ISDN communication terminal equipment (not shown). The bidirectional information communication is effected by information bursts having a transmission rate of 384 Kbit/s. The information communication covers two message channels—which are referred to as B-channels given ISDN connections—as well as one signalling channel—D-channel—and covers additional information for the frame synchronization, for additional service channels and a further, transparent channel—for example, for a packet switching.

With the assistance of a multiplex-demultiplex unit MD, the received message and signalling information or the message and signalling information to be transmitted are combined to form an information stream of 2084 Kbit/s and are routed to an ISDN-oriented, internal system bus interface. This system bus interface IOM is connected to an identically realized, internal, ISDN-oriented system of a periphery controller ELIC arranged in the base station line module SLMC. The system bus interface IOM is realized in the periphery controller ELIC at a D-channel controller DA with whose assistance the allocation or the blocking of the signalling channels in the trunk lines VL is effected. The message channels, i.e. B-channels, are switched to a switching unit EPIC. A timeslot-controlled switching network having 2048 Kbit/s inputs is implemented in this switching unit EPIC. 32 connections for ISDN communication terminal equipment or 64 message channels of 64 Kbit/s can be switched with the assistance of this switching network. This means that 64 communication terminal equipment units KE wirelessly connected to the base stations BS are switchable with the assistance of this switching network. The switching unit EPIC further comprises three bidirectional, PCM-oriented bus interfaces PCM1 . . . PCM3, whereby the first bus interface PCM1 is connected to a group switching network GKF of a line termination unit module LTM. The first bus interface PCM1 represents the base station line module bus interface PCM1. The line termination unit module LTM is part of a line connecting equipment unit LTE that can accept a plurality of base station line modules SLMC. Instead of these base station line modules SLMC, for example, subscriber line modules (not shown) for ISDN communication terminal equipment or analog communication terminal equipment, for example, can be inserted.

In addition to comprising the group switching network GKF, the line termination unit module LTM additionally comprises a line module controller LST realized by a microprocessor system. The group switching network GKF is connected to a central switching network (not shown) of the communication system via further PCM-oriented multiplex lines ML. Further, the line module controller LST is connected to a central controller (not shown) via a signalling line SL operating according to the HDLC transmission method. Analogous thereto, the line module controller LST is connected via, for example, a first input E1 to an interface controller SST arranged in the periphery controller ELIC. The information communication is thereby likewise implemented according to the HDLC transmission method. The interface controller SST, furthermore, is connected via lines LE to the D-channel controller DA and is connected to a signalling controller SIS arranged in the switching unit ELIC. With the assistance of the D-channel controller SIS, the signalling information contained in the D-channels or to be inserted into the D-channels—for example, in channel 31 of the multiplexed bit stream that comprises 64 Kbit/s channels—are read or inserted and are conducted to or accepted from the signalling controller SIS. With the assistance of the signalling controller SIS, the signalling information are communicated by the HDLC transmission procedure to the first input E1 of the line module controller LST. With the assistance of the signalling channel controller DA, the signalling channels are controlled according to the control of the signalling or D-channels proposed in German Patent Application P 41 41 293.4, i.e. are temporarily allocated to one, and the others are blocked during this time.

The connections ADL between the second and third bus interface PCM2, PCM3 and the delta modulation or demodulation units ADPCM1, ADPCM2 have a transmission rate of 2048 Kbit/s, whereby respectively 16 bidirectional message channels can be processed by a delta modulation or demodulation units ADPCM1, ADPCM2. Let it be assumed for the exemplary embodiment that the transmission rate of a message channel can be reduced from 64 Kbit/s to 32 Kbit/s by the delta modulation/demodulation units. A further reduction to, for example 16 Kbit/s is possible given a significantly more involved data modulation/demodulation unit. As a result of the reduction in conformity with the exemplary embodiment, twelve message channels of 32 Kbit/s each can now be bidirectionally transmitted via the three trunk lines between the communication system and the base station BS, instead of the six message channels of 64 Kbit/s. This means that twelve communication terminal equipment units KE can be wirelessly connected to the base station BS—i.e., on the basis of a radio transmission.

The three trunk lines VL are each respectively connected to a line termination unit DSAC1 . . . 3 in the base station BS. Each of these line termination units DSAC1 comprises a transmission circuit UP realized according to the transmission circuit UP1 . . . UP8 with which a transmission according to the burst-operation transmission method is realized. The transmission circuit UP is connected to an ISDN interface circuit realizing an ISDN-oriented, internal system interface IOM, by contrast to the system bus interface IOM in the base station line module SLMC, and comprises only two message or B-channels and one signalling channel, as well as further internal information channels of the system. The ISDN interface module ISM is also connected to a signalling controller SIS. With the assistance of this signalling controller SIS, the signalling information of the signalling channels or D-channels are received or transmitted according to the HDLC transmission method, and are edited for a transmission via a processor interface PST and a local bus LB to a controller BST, i.e. are adapted for a communication via data, address and control lines of the local bus LB. This local bus LB is also connected to a read memory ROM and to a read-write memory RAM. The non-resistant information are thereby essentially stored in the read-write memory RAM, and the programs that monitor and coordinate the base station BS are essentially stored in the read memory ROM.

The ISDN-oriented, internal system interfaces IOME of the line termination units DSAC1 . . . 3 are conducted to a burst module BM. For the purpose of a coordination and monitoring by the controller BST, this burst module BM is connected to the local bus LB. With this burst module BM, the received message and signalling information or the message and signalling information to be transmitted are inserted into corresponding transmission frames according to the DECT Standard for cordless telephones, and are edited in view of their physical properties such that they can be transmitted to a radio module FM. The message and signalling information are transmitted with a radio frequency of 1880 HMz with the assistance of the radio module FM, likewise according to the DECT Standard. According to the DECT Standard, twelve bidirectionally directed 64 Kbit/s message channels, including the corresponding signalling information, can be wirelessly transmitted. This means that twelve communication terminal equipment units KE, i.e. twelve radio telephones, can be wirelessly connected to this base station BS.

The periphery controller ELIC, the transmission unit OCTAT, the line termination unit DSAC as well as the delta modulations or demodulation units DPCM are each especially advantageously realized by customer-specifiable, integrated circuits, and the circuit-oriented expense is reduced.

As previously explained, the transmission unit OCTAT and the line termination units DSAC1, DSAC2, and DSAC3 are each constructed according to the communications switching unit disclosed in German Patent Application P41 41 493.4. That communications switching unit, which is set forth in FIG. 2, will now be described in greater detail.

Figure 2:
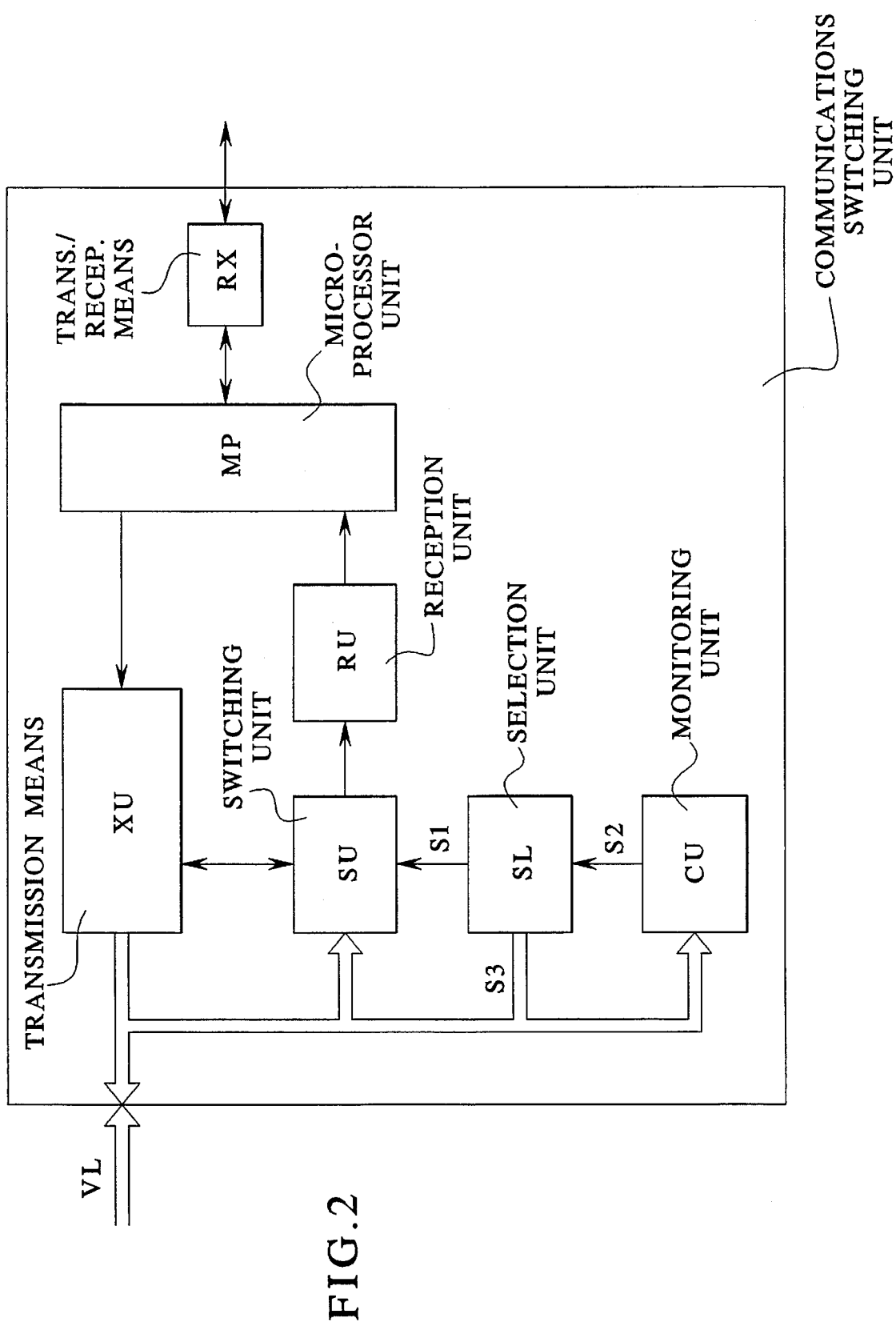
FIG. 2 is a block diagram of a communications switching unit employed in the system of FIG. 1

The communications switching unit shown in FIG. 2 contains a reception unit RU that interprets the signals supplied to it and edits them for a further processing, for example by a microprocessor unit MP and a transmission/reception means RX connected thereto. A switching unit SU that is connected to the transmission trunk lines VL and couples one of the transmission lines VL to the reception unit RU dependent on a control signal S1 to the reception unit RU. A monitoring unit CU coupled to the transmission lines VL is also provided, this detecting the appearance of transmission signals from the communications switching units at the other side of the trunk lines VL on respective transmission trunk lines VL and outputting corresponding information signals S2. These are supplied to a selection unit SL coupled to the monitoring unit CU, the transmission lines VL as well as to the switching unit SU, this selection unit SL selecting one of the transmission lines VL according to specific criteria dependent thereon and generating the corresponding control signals S1 for the switching unit SU and control signals S3 for communications switching units at the other side of the trunk lines. Beyond this, the communications switching unit also contains a transmission means XU that is connected between the transmission lines VL and the microprocessor unit MP that, however, is not critical for the further considerations and that is therefore not described in greater detail. After one of the communications switching units on the other side of the trunk lines VL has been selected by the selection unit SL, the non-selected communications switching units are, first, inhibited for the duration of the transmission mode of the selected communications switching unit with appropriate control signals and, second, the selected communications switching unit is inhibited for a specific time after the end of the transmission mode. For example, the sequence of the onset of transmission mode in the communications switching units at the other side of the trunk lines VL serves as criterion for the selection of a communications switching unit at the other side of the trunk lines VL. Each of the communications switching units at the other side of the trunk lines VL thus immediately begins with the transmission mode as soon as required. When a different communications switching unit at the other side of the trunk lines VL has already been selected since this already previously began the transmission mode, then a corresponding signal is transmitted to the communications switching unit that began transmission mode later, whereby this ends its transmission mode and reassumes it at a later time. In case two or more of the communications switching units at the other side of the transmission mode at the same time, then procedures is governed according to a priority strategy deposited in the selection unit SL.

The communications switching unit described makes it possible to service the signalling channels—for example, D-channels—of a plurality of terminal equipment units—for example, 24—with a single reception unit. For example, transmission protocols on an HDLC basis in full-duplex mode—for example, LAP-D—are thereby employed. The required sequencilization of the data transmission is automatically established in the transmission direction. It is guaranteed in the reception direction by the selection unit SL and an additional control channel. The selection unit SL uses the control channel to allocate the signalling channel to the terminal equipment or, respectively, to withdraw it from them. One control channel is thereby available per terminal equipment. It is unidirectionally operated in a master-slave configuration. Via it, the terminal equipment (slaves) are informed by the selection unit (master) as to whether they are allowed to transmit on their signalling channel. Just like the signalling channel, the control channel is transparently handed over across all interfaces. As warranted, the bit error probability on the control channel can be reduced with last-look methods. A control unit such as, for example, the microprocessor MP communicates with the terminal equipment (communications switching units at the other side of the trunk lines VL) via the corresponding signalling channels. Transmission port timeslot and timeslot length can be freely programmed in the transmission direction. This can therefore sequentially address any desired terminal equipment unit. An external signal, what is referred to as a strobe signal, that selects the reception port/timeslot is selected in the reception direction. This strobe signal is generated by the selection unit.

The selection unit SL allocates a respective communications switching unit at the other side of the trunk lines VL to the reception unit RU. Via the control channel, it tells the communications switching unit at the other side of the trunk lines VL whether the respective signalling channels are available or blocked. All signalling channels are inhibited after the system initialization. After a user has successfully carried out an activation procedure, for example, the selection unit places the user into a request list. All terminal equipment that are included in this list are first informed of the availability of their signalling channels. As soon as the first terminal equipment unit begins to transmit, the reception unit is synchronized to the transmitting terminal equipment with the strobe signal and the signalling channels of all other users are blocked. When a plurality of users begin to transmit simultaneously, then the selection unit SL decides with reference to a priority strategy to whom the signalling channel is allocated or, respectively, from whom it is withdrawn. It is thereby simultaneously assured that, given a plurality of terminal equipment transmitting simultaneously, each terminal equipment unit will be selected once before a terminal equipment unit is activated for a second time. The individual channels are transmitted in time-division multiplex mode.

In conclusion, let it be pointed out that a plurality of units such as, for example, the reception unit RU, the switching unit SU, the selection unit SL as well as the microprocessor can be realized by a single unit, for example a signal processor. Beyond this, it is also possible to combine the signalling channel and the control channel to form a single channel.

The above-described concept of a linkage of base stations BS to a communication system KS, particularly a large communication system KS, represents an especially economical solution in view of development and realization expense, taking the co-use of existing program-oriented and design and circuit-oriented components of the communication system and far-reaching circuit-oriented integration of the individual components into consideration, this being improved by the employment of delta modulation/demodulation methods for PCM-oriented signals in the communication system KS.

Although various minor changes and modifications might be suggested by those skilled in the art, it will be understood that we wish to include within the scope of the patent warranted hereon all such changes and modifications as reasonably come within our contribution to the art.

We claim as our invention:

1. A system comprising:

a plurality of wireless terminal equipment units;

at least one base station having a radio unit for wireless transmission to the terminal equipment units;

a communication system connecting trunk lines to the at least one base station;

said communication system having at least one switching unit for effecting a switching of the terminal equipment units wirelessly connected to the at least one base station;

said base station not containing any switching units for effecting the switching of the terminal equipment units;

said at least one switching unit in said communication system connecting via a transmission unit to said trunk lines, said at least one base station having transmission units connecting said trunk lines to said radio unit, said transmission unit of said communication system and said transmission units of said base station performing a burst-operation transmission method between the communication system and the at least one base station for transmitting digitized voice and signaling information according to burst-operation transmission, one transmission channel being provided between the base station and the communication system for each wirelessly connected terminal equipment unit to which the base station communicates via the radio unit.

2. A system according to claim 1 wherein a plurality of switching units are provided in said communication system, each switching unit being provided in a base station line module having a respective transmission unit connected to the respective switching unit.

3. A system according to claim 1 wherein a plurality of said base stations are provided, and wherein said transmission unit of said communication system connects via trunk lines to the plurality of base stations.

4. A system according to claim 1 wherein said transmission units of said base station each comprise a line termination unit.

5. A system according to claim 1 wherein the switching unit is provided in a base station line module in a communication system, and the base station line module connects via said transmission unit and the trunk lines to line termination units in the base station.

6. A system according to claim 1 wherein the switching unit and its connected transmission unit in the communication system are provided in a base station line module;

said transmission unit comprises a plurality of transmission interfaces operating according to the burst-operation transmission method and comprising an internal, ISDN-oriented system bus interface; and said switching unit is formed by a periphery controller comprising an internal, ISDN-oriented system bus interface and a PCM-oriented subscriber line module bus interface.

7. A system according to claim 1 wherein said communication system comprises a base station line module having said switching unit and said transmission unit therein, and wherein a compression means for compressing or decompressing the digitized voice signals are provided in said base station line module, said compression means being connected via a PCM-oriented bus interface to a bus interface of a periphery controller containing said switching unit for transmission of compressed or decompressed digitized voice information.

8. A system according to claim 7 wherein said compression means are provided as compression units operating according to a delta-modulation method for PCM-oriented, digitized voice information.

9. A system according to claim 8 wherein said compression units are formed by four integrated, echo-compensating or echo-suppressing compression circuits that respectively compress or decompress the digitized voice signals for four bidirectional transmission channels, said compression circuits each respectively comprising a PCM-oriented bus interface having a transmission rate of 248 Kbit/s that is connected to a bus interface of said switching unit of said communication system.

10. A system according to claim 1 wherein said transmission units in said base station each comprise a line termination unit having a transmission interface operating according to the burst-operation transmission method as well as an ISDN-oriented, internal system interface, said ISDN-oriented internal system interface being connected to a burst means for editing the digitized voice signals into burst-oriented transmission signals for radio-transmission and a processor interface for every line termination being connected to a central controller, and said burst means being connected to said center controller and to said radio unit.

11. A communication system according to claim 10 wherein said burst controller and said radio unit are designed such that burst-oriented transmission and reception signals as well as received radio signals or transmitted radio signals are formed according to a DECT standard.

12. A system, comprising:

a plurality of wireless telephone terminal equipment units;

a plurality of base stations, each base station containing a radio unit for communication with various ones of said wireless telephone terminal equipment units;

a communication system connecting via trunk lines to said plurality of base stations;

said communication system having a plurality of base station line modules, each base station line module having a switching unit for effecting a switching of the terminal equipment units wirelessly connected to the base stations, and each base station line module having a transmission unit connected to its respective switching unit, said transmission unit having a plurality of transmission circuits connecting to said trunk lines;

said base stations not containing any switching units for effecting the switching of the terminal equipment units;

said base stations each having a plurality of transmission units connecting to respective ones of said trunk lines, said transmission units each comprising a line termination unit; and said transmission units of said communication system and said transmission units of said base station providing burst-operation transmission of digitized voice and signalling information between said base stations and said communication system, and one transmission channel being provided between the base stations and the communication system for each wirelessly connected terminal equipment unit to which the base stations communicate via the respective radio units.

* * * * *